(No Model.)

D. BROOKS, Jr.
CONDUIT FOR ELECTRIC WIRES.

No. 314,791. Patented Mar. 31, 1885.

WITNESSES:
A. P. Grant,
W. F. Kircher

INVENTOR:
David Brooks, Jr.,
BY Joshua Diedersheim
ATTORNEY.

UNITED STATES PATENT OFFICE.

DAVID BROOKS, JR., OF PHILADELPHIA, PENNSYLVANIA.

CONDUIT FOR ELECTRIC WIRES.

SPECIFICATION forming part of Letters Patent No. 314,791, dated March 31, 1885.

Application filed June 14, 1883. (No model.)

*To all whom it may concern:*

Be it known that I, DAVID BROOKS, Jr., a citizen of the United States, residing in the city and county of Philadelphia, State of Pennsylvania, have invented a new and useful Improvement in Conduits for Electric Wires, which improvement is fully set forth in the following specification and accompanying drawings, in which—

Figure 1:
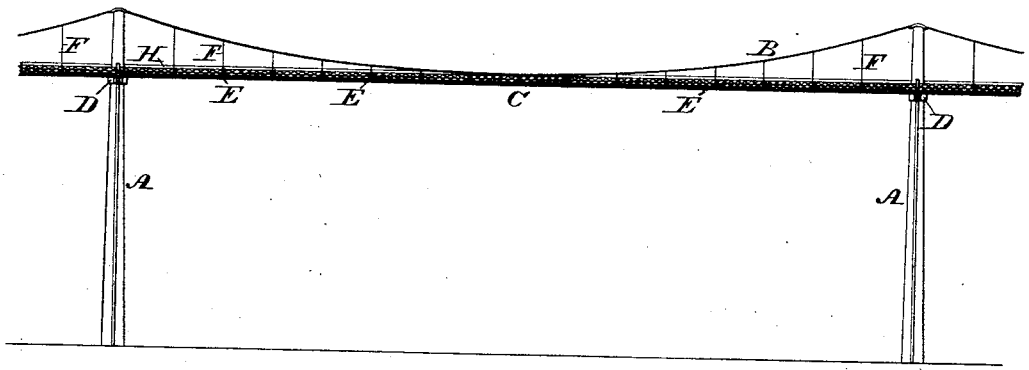
Figure 2:
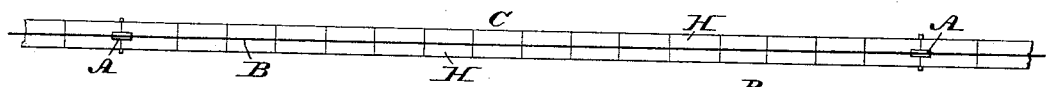
Figure 3:
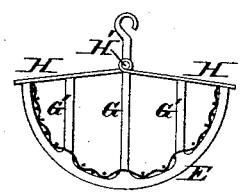
Figure 4:
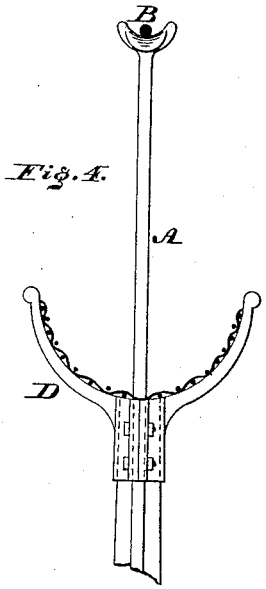

Figure 1 is a side elevation of a conduit for electric wires embodying my invention. Fig. 2 is a top or plan view thereof. Figs. 3 and 4 are views of detached portions, enlarged.

Similar letters of reference indicate corresponding parts in the several figures.

My invention consists of an elevated or aerial conduit for electric wires, formed of a trough suspended in such manner as to be securely retained in a horizontal line and possessing other advantages, as will be hereinafter fully set forth.

Referring to the drawings, A A represent the supporting-poles of the conduit, the same being placed at suitable distances apart; and B represents a cable which is sustained thereon.

C represents a trough or semi-cylindrical receptacle formed of woven wire or other suitable material, arranged horizontally and extending from pole to pole, the same being supported on brackets D and anchors E, which are formed of metal shaped to conform to the under side of the trough, the brackets D being connected with the poles A below the tops thereof, and the anchors E with the cable B, by means of wires F, which are attached to said cable, and to upright rods or bars G, secured to or formed with the anchors at the centers thereof, said bars also forming divisions in the anchors, which may be increased by partitions G', whereby electric wires or cables of different kinds laid in the trough may be kept separate from each other. The top of the trough is covered by lids H, which are hinged to a rod, H', supported on the central rods or bars, G, of the anchors or on the poles A, it being noticed that there are two rows of lids, so that when one row requires to be open the other provides a support or pathway for the workman or operator, the lids, when closed, preventing rain, snow, &c., falling into the trough from above. The poles A are preferably formed with ribs, producing cross-shaped figures in horizontal section, the same being light, strong, and durable, and the portions of the poles above the brackets may be made of reduced thickness. The number of anchors employed is in accordance with requirements relative to the weight of the trough or distance between the poles, and as the trough is preferably formed of woven wire or open-work, the bars G G' of the anchors may be readily passed through the meshes or spaces thereof in order to apply the parts in position. It will be seen that the trough may receive numerous electric wires and cables, and it is firmly supported and held in horizontal position or level, avoiding sagging, and may be made light, strong, and durable.

Having thus described my invention, what I claim as new, and desire to secure by Letters Patent, is—

1. An elevated conduit for electric wires, having a wire-receiving trough formed of woven wire or open-work, substantially as and for the purpose set forth.

2. An elevated conduit for electric wires, consisting of a wire-receiving trough, C, poles A, extended above said trough, a suspension-cable extending from top to top of the poles, wires F, depending from said cable, and anchors E, attached to said wires, the said anchors extending under said trough and conforming to the shape thereof, substantially as set forth.

3. An elevated conduit for electric wires, having a wire-receiving trough formed of woven wire or open-work provided with anchors E, which embrace said trough at intervals and hold it in shape, substantially as set forth.

4. A suspended wire-holding trough having supporting-anchors, the latter being provided with upright partitions, substantially as and for the purpose set forth.

5. An elevated conduit for electric wires, consisting of poles, a trough, a suspension-cable, and supporting anchors and brackets, substantially as and for the purpose set forth.

6. A curved anchor, E, for receiving a wire-holding trough, said anchor being provided with a hook, whereby it may be suspended, bars G G', which separate the wires from one another, and lids H, which close the top of said trough on either side or on both sides of the central line, as set forth.

DAVID BROOKS, JR.

Witnesses:
JOHN A. WIEDERSHEIM,
A. P. GRANT.